United States Patent [19]

Lawhon

[11] 3,925,051
[45] Dec. 9, 1975

[54] REMOVABLE DAM BARRIER FOR A FLOAT CHAMBER OF A GLASSMAKING APPARATUS

[75] Inventor: Robert A. Lawhon, Carlisle, Pa.

[73] Assignee: PPG Industries, Inc., Pittsburgh, Pa.

[22] Filed: Oct. 15, 1974

[21] Appl. No.: 514,975

[52] U.S. Cl. ............... 65/65 A; 65/99 A; 65/182 R
[51] Int. Cl.² .......................................... C03B 18/02
[58] Field of Search ............... 65/65 A, 99 A, 182 R

[56] References Cited
UNITED STATES PATENTS
3,485,617   12/1969   Lawrenson ..................... 65/182 R

*Primary Examiner*—Arthur D. Kellogg
*Attorney, Agent, or Firm*—Donald Carl Lepiane; E. Kears Pollock

[57] ABSTRACT

The bottom of a float chamber of a glassmaking apparatus of the type used for manufacturing flat glass is provided with generally inverted "T"-shaped grooves for receiving dam barrier sections each having a generally inverted "T"-shaped, cross-sectional configuration. Dam barrier sections are positioned in one of the grooves to form a dam barrier to provide discrete compartments of molten metal in the float chamber.

18 Claims, 4 Drawing Figures

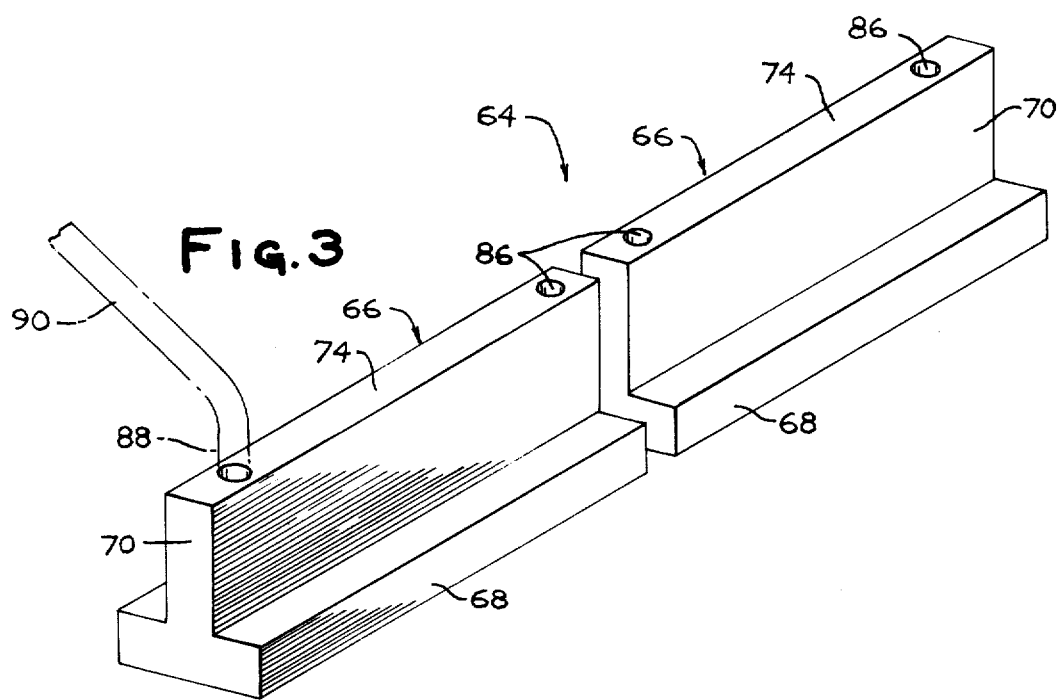
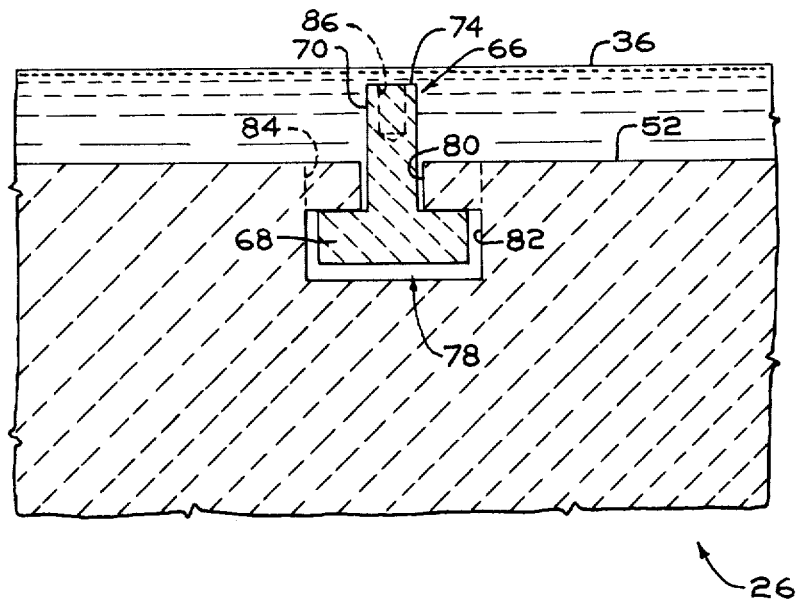

REMOVABLE DAM BARRIER FOR A FLOAT CHAMBER OF A GLASSMAKING APPARATUS

CROSS REFERENCE TO RELATED APPLICATIONS

The dam barrier of this invention may be used with the teachings of U.S. patent application Ser. No. 338,497 filed Mar. 6, 1973, in the names of Charles K. Edge and Gerald L. Kunkle and entitled "Manufacture of Glass by Continuous Float Glass Process"now U.S. Pat. No. 3,843,346; U.S. patent application Ser. No. 483,508 filed June 27, 1974, in the name of Gerald E. Kunkle and entitled "Manufacture of Glass"; and U.S. patent application Ser. No. 514,980 filed Oct 15, 1974 in the name of John Sensi and entitled "Active Dam Barriers for Use in the Manufacture of Glass".

BACKGROUND OF THE INVENTION

Field of the Invention

This invention relates to removable and/or insertable dam barriers for use in a float chamber of a glasssmaking apparatus to provide discrete compartments of molten metal in the float chamber.

Discussion of the Problem

The advantages of dam barriers in the glassmaking art have been recognized, more particularly, the use of dam barriers in a float chamber of a glassmaking apparatus used for making flat glass is taught in U.S. Pat. Nos. 789,911 and 3,607,199.

The advantages of using movable dam barriers in a forming chamber of a glassmaking apparatus to control convection currents in molten metal contained in the forming chamber are discussed in U.S. patent application Ser. No. 514,980 filed on Oct. 15, 1974 in the name of John Sensi and entitled "Active Dam Barriers for the Use in the Manufacture of Glass".

Although there are disclosed different types of movable dam barriers in the above mentioned application, it would be advantageous if there were provided other embodiments of movable dam barriers which facilitate insertion and removal of the dam barrier from the forming chamber.

SUMMARY OF THE INVENTION

In general, the invention relates to an imrovement in a glassmaking apparatus for making a continuous glass sheet. The glassmaking apparatus is of the type including a glass melting furnace for melting glassmaking ingredients, a forming chamber having a bottom bounded by side members and end members for containing a pool of supporting molten metal and delivery facilities connecting the glassmaking furnace and the forming chamber for delivering molten glass from the glassmaking furnace onto the supporting molten metal contained in the forming chamber. The improvement includes a plurality of dam barrier sections and detachably securing facilities provided at the bottom of the forming chamber for translatably mounting the plurality of dam barrier sections at the bottom of the forming chamber. The dam barrier sections form a dam barrier to provide discrete compartments of molten metal in the forming chamber.

In the preferred embodiment, the detachably securing facilities include a groove having an inverted "T"-shaped, cross-sectional configuration formed in the bottom of the forming chamber and graphite dam barrier sections having a shape complimentary to the shape of the groove.

Further, the invention relates to a method of positioning the dam barrier sections in the forming chamber.

BRIEF DESCRIPTION OF THE DRAWING

FIG. 3 is an isometric view of dam barrier sections incorporating features of the invention and illustrating facilities for moving the dam barrier sections along the grooves provided in the forming chamber as shown in FIG. 2.

FIG. 4 is a view taken along lines 4—4 of FIG. 2.

DETAILED DESCRIPTION

Figure 1:
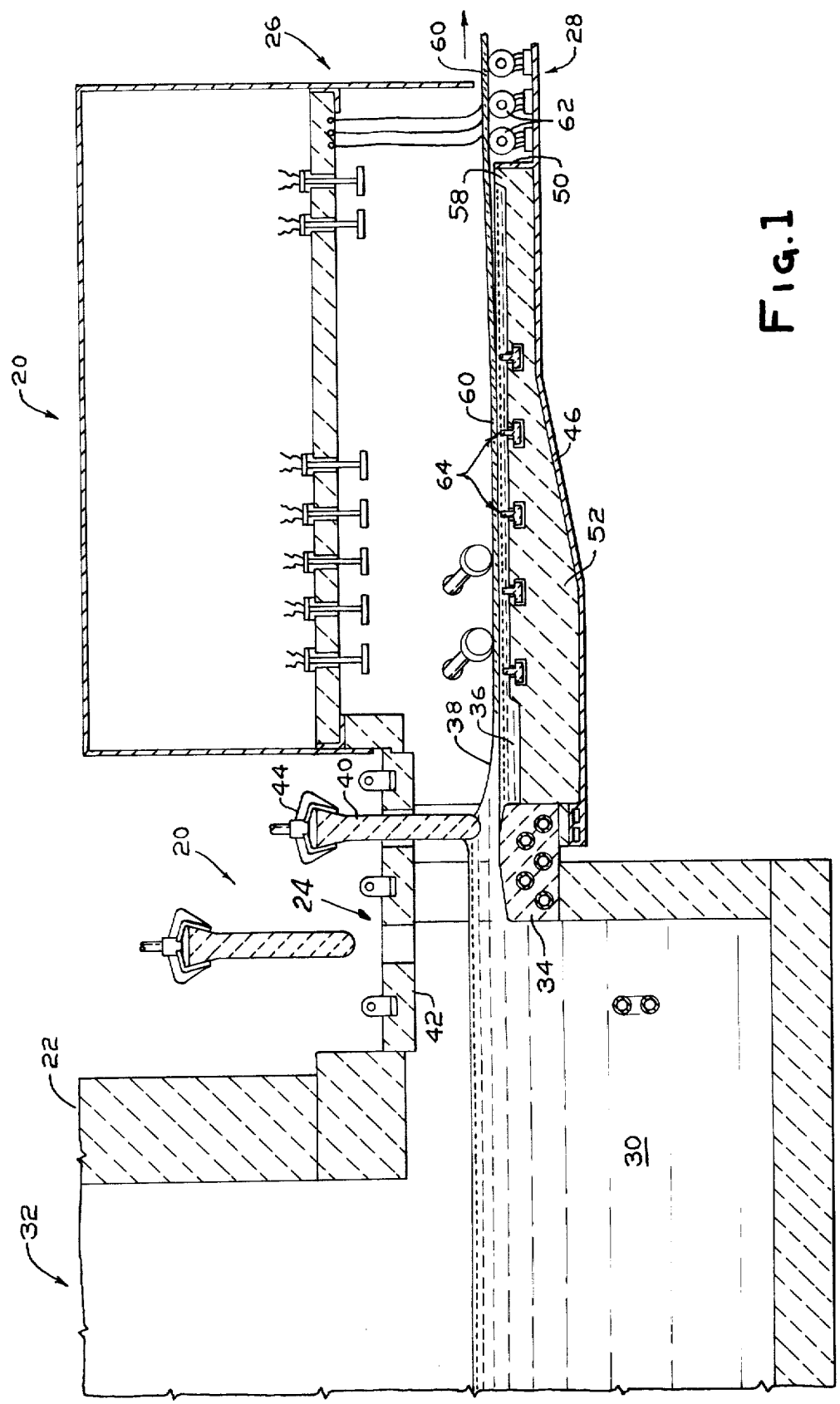
FIG. 1 is a sectional elevational view of a glassmaking apparatus that may be used for practicing the invention.

With reference to FIG. 1, there is shown a glassmaking apparatus 20 of the type disclosed in U.S. patent application Ser. No. 455,463 filed on Mar. 27, 1974, in the names of Charles K. Edge and Gerald E. Kunkle and entitled "Flat Glass Manufacturing Apparatus and Method" for making flat glass. As will become apparent, the invention is not limited to the glassmaking apparatus shown in FIG. 1 and that the invention may be practiced with any glassmaking apparatus using a float or forming chamber. For example, the invention can be practiced on the glassmaking apparatus taught in U.S. patent application Ser. No. 483,508 filed June 27, 1974, in the name of Gerald E. Kunkle and entitled "Manufacture of Glass". Still further, as will become apparent, the teachings of the invention may also be used to practice the method of making float glass disclosed in U.S. patent application Ser. No. 514,980 filed on Oct. 15, 1974 in the name of John Sensi and entitled "Active Dam Barriers for Use in the Manufacture of Glass". The above-identified applications are hereby incorporated by reference.

The glassmaking apparatus 20 of FIG. 1, in general, includes a glass melting furnace 22, delivery facilities 24, a float chamber 26 and a horizontal conveyor 28.

In general, the furnace 22 includes a melting section (not shown) where glassmaking ingredients are melted to form a pool of molten glass 30 and a fining or conditioning section 32, the end of which is shown, where the molten glass is fined or conditioned. The fined molten glass is thereafter moved over threshold 34 of the delivery facilities 24 onto a pool of supporting molten metal 36 contained in the float chamber 26. The molten glass 30 is supported on the molten metal as a layer of molten glass 38.

The delivery of the molten glass onto the pool of molten metal is regulated by a control tweel 40 which is raised and lowered through roof 42 of the delivery facilities 24, into contact with the molten glass by way of support assembly 44 (partially shown).

Figure 2:
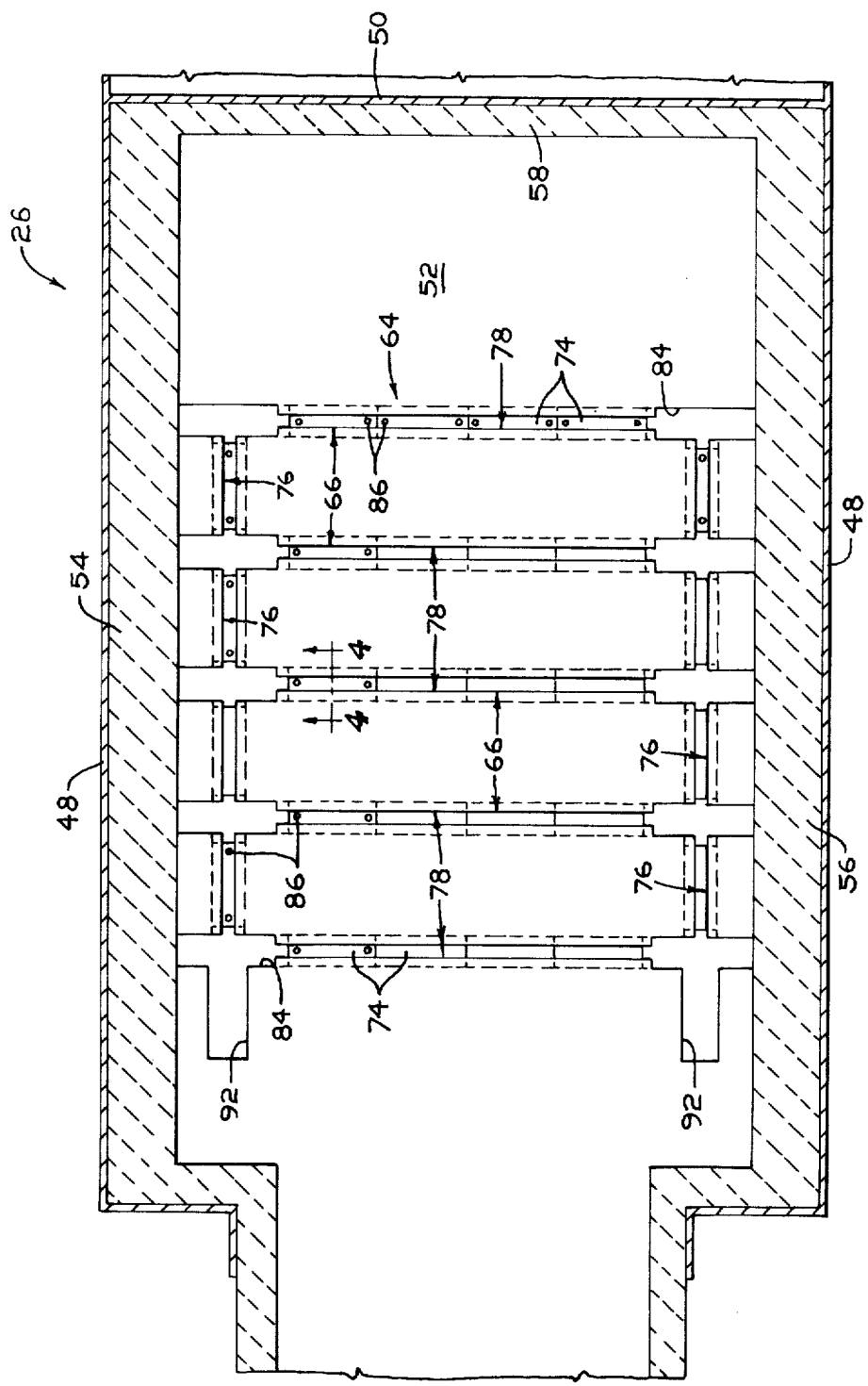
FIG. 2 is a top cross-sectional view of the forming chamber of the apparatus shown in FIG. 1 having portions removed for purposes of clarity and showing grooves for receiving dam barrier sections incorporating features of the invention.

With reference to FIGS. 1 and 2, the float chamber 26, in general, includes a bottom casing 46 (shown in FIG. 1) supported in any conventional manner, side casing 48 (shown in FIG. 2), and exit casing 50 to provide a shell into which there is disposed refractory material to provide a bottom 52, sidewalls 54 and 56 and an exit lip 58, respectively. The threshold 34, bottom 52, exit lip 58 and sidewalls 54 and 56 define a container into which the pool of molten metal 36 is disposed. Preferably the molten metal is tin or an alloy of tin.

Referring now to FIG. 1, as the layer of molten glass 38 moves along on the surface of the supporting molten metal 36, the molten glass is controllably cooled in any conventional manner to form a continuous sheet of glass 60. The glass sheet 60 as it moves over the exit lip 58 out of the float chamber 26 is horizontally conveyed by rollers 62 such as the type used in the art into an annealing lehr (not shown).

To aid in controlling the cooling of the molten glass as it moves through the float chamber, convection currents in the molten tin are controlled by dam barriers or weirs 64, incorporating features of the invention, disposed within the molten metal 36. The convection currents in the molten bath may be controlled in any conventional manner or in the manner taught in the above-mentioned U.S. patent application filed in the name of John Sensi.

The discussion will now be directed to the dam barriers 64 incorporating features of the invention. In general, the dam barriers 64 are provided with a shape that permits detachably securing the dam barrier in the bottom of the float chamber 26.

Referring now to FIG. 3, the dam barrier 64 includes dam barrier sections 66, which, as will be appreciated, facilitates the insertion and removal of the dam barrier sections into and out of the float chamber 26. The dam barrier sections 66 include a horizontal leg 68 and a vertical leg 70 joined together to form a generally inverted "T"-shaped configuration.

The dam barrier sections are preferably made of a material that is non-reactant with the molten metal and generally of a material having a density less than the density of the molten metal. For example, when the molten metal is tin or an alloy of tin, the dam barrier sections 66 are made of graphite. It is recommended that the density of the dam barrier sections 66 have a density less than the density of the molten metal so that during removal of the dam barrier 64 from the float chamber, in a manner to be discussed below, the dam barrier sections 66 float on the molten metal and are easily engaged for removal from the float chamber.

If desired to facilitate the insertion of the dam barrier into the molten metal, the dam barrier sections 66 may be provided with a density slightly less than the density of the molten metal. This not only facilitates removal of the dam barrier sections 66 from the float chamber 26 it also facilitates insertion of the dam barrier sections into the float chamber. An example of a dam barrier section having a density less than molten tin is a dam barrier section made of graphite embedded with, for example, molybdenum or an alloy of molybdenum and tungsten.

Also within the scope of the invention are dam barrier sections having a density greater than the molten metal. For example, when the molten metal is tin, the barrier dam sections 66 may be made of molybdenum or an alloy of molybdenum or tungsten. As can be appreciated, dam barrier sections having a density greater than the density of the molten metal will not float and have to be pulled out of the molten metal.

With continued reference to FIG. 3, when the dam barrier 64 is disposed in the molten metal under the glass sheet as shown in FIG. 1, it is recommended that the top surface 74 of the vertical leg 70 does not extend up to the surface of the molten metal, e.g., as shown in FIG. 4. Any contact between the glass and dam barrier can cause drag on the glass moving through the float chamber and can mar the surface of the subsequently formed glass sheet.

In those instances where the dam barriers are not disposed under the glass, e.g., when the dam barriers are positioned adjacent the edges of the glass sheet, the top surface 74 of the dam barrier 64 may extend up to and even beyond the surface of the molten metal.

With reference to FIGS. 2 and 4, the discussion will now be directed to facilities provided in the bottom of the float chamber 26 for detachably securing the dam barrier sections 66 in the molten metal. As will be appreciated, the detachably securing facilities to be discussed are merely illustrative of those that may be used and the invention is not limited thereto.

With specific reference to FIG. 2, there is shown a plurality of longitudinal grooves 76 extending upstream from the exit lip 58 in spaced relation to the sidewalls 54 and 56 and a plurality of lateral grooves 78 extending between sidewalls 54 and 56 of the forming chamber 26. As will be appreciated, this array of grooves is only illustrative and other arrays can be employed. Further in certain instances as taught in the above-mentioned U.S. Patent Application filed in the name of John Sensi, other arrays of dam barriers are recommended.

The grooves 76 and 78 are identical in construction and therefore the discussion will be directed to the lateral grooves 78 with the understanding that the discussion is applicable to the longitudinal grooves 76 unless indicated otherwise.

With reference to FIG. 4, the groove 78 has a cross-section configuration complimentary to the cross-section configuration of the dam barrier sections. In our example the dam barrier section has an inverted "T"-shaped, cross-sectional configuration (see FIG. 3) and therefore the groove or keyway 78 has an inverted "T"-shaped, cross-sectional configuration as shown in FIG. 4.

The upper portion 80 of the groove 78 has a width slightly greater than the width of the vertical member 70 of the dam barrier sections 66 (see FIG. 4) and a lower portion 82 slightly greater than the cross-sectional dimension of the horizontal leg 68 of the dam barrier section. In this manner, a dam barrier section 66 is easily moved in the groove 78. The distance between the surface 74 of the dam barrier sections and the surface of the molten metal can be determined by considering the depth of the molten metal, the height of the vertical leg 70 and the depth of the upper portion 80 of the groove 78.

When the dam barrier sections are made of a material having a density less than the density of the molten metal, the dam barrier section begins to float upward but is prevented from doing so because the upper portion 80 of the groove 78 has a width less than the width of the horizontal member 68 of the dam barrier section 66.

In general, when the dam barrier sections 66 are made of a material having a density greater than the density of the molten metal, the upper portion 80 of the groove 78 can be enlarged to the size of lower portion. However, to prevent any unwanted movement of the dam barrier section, it is recommended that the dam barrier section be detachably secured to the bottom, e.g., as was previously discussed.

Referring now to FIG. 2, the discussion will now be directed to provisions for inserting the dam barrier sections 66 in the grooves 76 and 78. Provided at each end of the groove 78 there is a well 84 (shown in phantom in FIG. 4) having dimensions sufficient to receive the horizontal leg 68 of the dam barrier sections 66 such that the end of the dam barrier section is aligned with end of the groove 78. Thereafter, the dam barrier section is moved into the groove 78.

With reference to FIG. 3, to facilitate insertion and removal of the dam barrier sections there is provided holes 86 in surface 74 of the vertical leg 70. End 88 of a bar 90 (shown in phantom in FIG. 3) is positioned in the hole to move the dam barrier section along the groove 78 from or into the well 84. As can now be appreciated, the invention is not limited to any particular device for insertion and removal of the dam barrier sections and that the bar 90 is merely illustrative of one device that may be used.

Shown in FIG. 2, a well 84 is provided at each end of the groove 78. In this manner, the dam barrier section can be inserted from either sidewall.

The longitudinal grooves 76 are provided with a well 92 similar to the well 84 for inserting dam barrier sections into the grooves 76. If desired a well may be provided at each end of the longitudinal grooves 76 or between the ends of the longitudinal grooves 76 as shown in FIG. 2.

As can now be appreciated, the invention is not limited to the configuration of the dam barrier sections. For example, the invention can be practiced when the dam barrier sections have an "I"-shaped configuration, an "L"-shaped configuration or a wedge shaped configuration. Although the discussion was directed to providing a groove in the bottom 52 of the forming chamber 28, the invention is not limited thereto. For example, a member having a groove, as previously discussed, may be provided on the bottom of the forming chamber for receiving the dam barrier sections. Further, a guide rail may be provided on the bottom of the forming chamber for receiving the dam barrier sections. The guide rail, for example, may have a "T"-shaped configuration to receive dam barrier sections having a "T"-shaped groove or keyway.

Further, as can now be appreciated, the dam barrier sections of this invention provide a fast and easy way to insert or remove dam barriers in the molten metal contained in a float chamber. Further, they provide a fast and easy way to change the height of the dam barriers in molten metal contained in a float chamber. Still further, the dam barrier sections can be removed and inserted while a glass sheet is moving through the chamber supported on the molten metal.

DETAILED DESCRIPTION OF THE INVENTION

The invention will now be described using the dam barriers of the invention to provide compartments of molten metal in a float chamber of a glassmaking apparatus of the type disclosed in the above-mentioned U.S. patent applicaation Ser. No. 455,463.

Referring to FIG. 1, there is shown a glassmaking apparatus 20 which includes a glassmaking furnace 22, delivery facilities 24, a float chamber 26 and a conveyor 28. The glassmaking furnace 22, in general, includes a melting section (not shown) in which glassmaking ingredients are melted to form a molten pool of glass 30. The molten pool of glass 30 moves into conditioning section 32, the end of which is shown where the glass is conditioned. The conditioned glass is then controllably delivered over threshold 34 of the delivery facilities 24 onto a pool of molten tin 36 contained in the float chamber 26 as a layer of molten glass 38. The rate of glass delivery into the float chamber is controlled by a control tweel 40 which is raised and lowered through roof 42 of the delivery facility 24 by a support assembly 40, partially shown.

The layer of molten glass is supported by the molten tin and moves downward toward exit lip 58 of the float chamber. As the glass moves through the float chamber, it is cooled to provide a sheet of glass 60 which is conveyed out of the float chamber over the exit lip 58 on a conveyor 26. The conveyor 26 is of the type known in the art.

Referring now to FIGS. 1 and 2, the discussion will be directed to the float chamber 26. The float chamber 26 is advantageously provided with a bottom casing 46, side casing 48 (shown in FIG. 2) and end casing 50 to support a refractory bottom 52, refractory sidewalls 56 and 54 and refractory exit lip 58, respectively. Provided within the bottom 52 of the float chamber are a plurality of spaced, parallel, lateral grooves 78 and spaced parallel longitudinal grooves 76.

The grooves 76 and 78 are identical in construction and therefore, for ease of discussion, the lateral grooves 78 will be discussed with the understanding that the discussion is applicable to the longitudinal groove 76 unless indicated otherwise.

With reference to FIG. 4, the groove 78 has a generally inverted "T"-shaped, cross-section having an upper portion 80 and a lower portion 82. the upper portion as viewed in FIG. 4 communicates with the surface of the float chamber bottom 52 and has a width of about 1¼ inches (3.18 cm.) and a depth of about 1 inch (2.54 cm.). The lower portion of the groove 78 as viewed in FIG. 4 has a depth about 1¼ inches (3.18 cm.) and a width of about 3¼ inches (8.26 cm.).

Referring back to FIG. 2, there are provided 5 longitudinal grooves 78 in the bottom 52 of the float chamber. The grooves 78 are spaced about 18 inches from adjacent sidewalls and on a center-to-center spacing of about 10 feet (3.04 meters).

Provided between the ends of the groove 78 and adjacent sidewall there is provided a well 84 having a depth of about 2¼ inches (5.72 cm.), a width of about 3¼ inches (8.26 cm.) and a length of about 2 feet (0.61 meters).

Positioned adjacent each sidewall 54 and 56 and spaced about 9 inches (23 cm.) therefrom are the longitudinal grooves 76. At the upstream end of each groove 76 there is provided a well 92 similar in dimension and shape to the well 84.

Referring to FIG. 3, there is shown a dam barrier section 66 made of graphite and having a horizontal leg 68 and a vertical leg 70 joined to provide the dam barrier section with an inverted "T"-shaped, cross-sectional configuration. As viewed in FIG. 3, the horizontal leg has a height of about 1 inch (2.54 cm.) and a width of about 3 inches (7.62 cm.) and the vertical leg has a height of about 3⅛ inches (7.94 cm.) and a width of about 1 inch (2.54 cm.) so that the dam barrier section is easily moved into the grooves 76 and 78.

The depth of the molten tin is about 2½ inches (5.72 cm.) and the top 74 of the dam barrier will be approximately ⅜ inch (0.95 cm.) below the surface of the molten metal.

The overall length of the dam barrier section is less than about 2 feet (0.61 meters) so that it can easily be inserted into the well 84 and/or 92. Provided on the top surface 74 of the dam barrier section 66 is a hole 86 spaced about 3 inches (7.62 cm.) from each end.

The method for inserting a dam barrier section into the float chamber bottom 52 as the glass sheet 60 moves through the float chamber supported on the molten metal will now be discussed. A dam barrier section is submerged into the molten tin into a well 84 associated with a lateral groove 78. The section is submerged in the well by inserting end 88 of a bar 90 into a hole 86 and thereafter moved into the groove 78. A second section is then inserted into the well in a similar manner and moved into the groove. The recently inserted dam barrier section engages the end of the previously inserted dam barrier section and moves the dam barrier section under the glass sheet. The procedure is repeated until dam barrier sections are provided from approximately the center of the bath to the well 84. Thereafter the same procedure is repeated on the other side to provide a dam barrier 64 made up of dam barrier sections. The process is repeated for each of the lateral grooves as desired.

The similar procedure for providing the dam barrier section in the lateral grooves 78 is repeated for providing dam barrier sections in the longitudinal grooves 76.

To remove, the dam barrier sections, blanks similar in shape to the dam barrier section 66 shown in FIG. 3 but having a vertical leg 70 of about 1 inch (2.54 cm.) are inserted in the well 84 shown in FIG. 2. The blanks are moved into the groove in a similar manner as the dam barrier sections were inserted. As individual ones of the blanks are moved into the groove, individual ones of the dam barrier sections are removed at the opposite end.

In the instance where blanks are in the grooves, the dam barrier sections are inserted as previously discussed into the groove at one end as the blanks are removed at the opposite end.

When dam barrier sections extend above the tin bath, they are removed by engaging the dam barrier sections as previously discussed and moving them into the well.

I claim:

1. In a glassmaking apparatus for making a continuous glass sheet wherein the glassmaking apparatus is of the type comprising a glass melting furnace for melting glassmaking ingredients; a forming chamber having a bottom bounded by side members and end members for containing a pool of supporting molten metal; and delivery means connecting the glassmaking furnace and the forming chamber for delivering molten glass from the glassmaking furnace onto the pool of supporting molten metal, the improvement comprising:
   a plurality of dam barrier sections;
   means provided within the chamber at the bottom thereof adjacent a side member for vertically receiving individual ones of said plurality of dam barriers; and
   recess means at the bottom of the forming chamber in communication with said receiving means, said recess means provided with means for restricting upward movement of said dam barrier sections.

2. The apparatus as set forth in claim 1 wherein said recess means includes a groove for receiving said dam barrier sections, said groove having a first portion and a second portion larger in size and dimensions than the first portion and spaced a greater distance from the surface of the molten metal than the first portion of the groove, and said dam barrier sections having a cross-sectional configuration complementary to the groove so that said dam barrier sections are insertible in said grooves.

3. The apparatus as set forth in claim 2 wherein said groove is provided in the bottom of the forming chamber.

4. The apparatus as set forth in claim 2 wherein said groove is provided on the bottom of the forming chamber.

5. The apparatus as set forth in claim 2 wherein said groove has an inverted "T"-shaped, cross-sectional configuration and said dam barrier sections have an inverted "T"-shaped configuration for insertion into said groove.

6. The apparatus as set forth in claim 2 wherein the forming chamber includes opposed sidewalls and said groove extends between the sidewalls.

7. The apparatus as set forth in claim 2 wherein the forming chamber includes opposed sidewalls and said groove extends along and spaced from each sidewall.

8. The apparatus as set forth in claim 1 wherein said dam barrier sections are made of a material that has a density less than the density of the molten metal.

9. The apparatus as set forth in claim 8 wherein said dam barrier sections are made of graphite and the molten metal contains tin.

10. The apparatus as set forth in claim 1 wherein said dam barrier sections are made of a material having a density greater than the density of the molten metal.

11. The apparatus as set forth in claim 5 wherein the upper leg of each of the "T"-shaped dam barrier sections is provided with means to be engaged for moving the dam barrier sections in said grooves.

12. The apparatus as set forth in claim 2 wherein said receiving means includes a well disposed at the bottom of the forming chamber and connected to said groove for receiving individual dam barrier sections in spaced alignment with said groove.

13. The apparatus as set forth in claim 1 wherein said recess means includes a member having a first section and a second section smaller in size and dimensions than the first section and spaced a greater distance from the surface of the molten metal than the first section of the member, and said dam barrier sections having a cross-sectional configuration complimentary to the member so that said dam barrier sections are insertable on said member.

14. A method of positioning a dam barrier in a forming chamber of a glassmaking apparatus, the forming chamber containing a pool of supporting molten metal wherein the dam barrier provides discrete compartments of molten metal in the forming chamber, comprising the steps of:
   providing a plurality of dam barrier sections;
   providing within the chamber at the bottom thereof adjacent a side member means for vertically receiving individual ones of the dam barrier sections;
   providing recess means at the bottom of the forming chamber in communication with the receiving means to restrict upward movement of the dam barrier sections;
   sequentially inserting individual ones of the plurality of dam barrier sections into the receiving means; and sequentially moving the dam barrier sections from the receiving means into the recess means to provide a dam barrier.

15. The method as set forth in claim 14 wherein the recess means are grooves having an inverted "T"-shaped configuration and the receiving means includes at least one well aligned with ones of the grooves, and the dam barrier sections each have an inverted "T"-shaped, cross-sectional configuration wherein said inserting step is accomplished by:
submerging a dam barrier section in the molten metal into the well;
sliding the dam barrier section into the groove; and
repeating said submerging and sliding step to provide a dam barrier in the molten metal.

16. A method of removing a dam barrier from a forming chamber, wherein the dam barrier comprises a plurality of dam barrier sections mounted in recess means at the bottom of the forming chamber, the recess means being in communication with a first and second vertical receiving means, disposed about the recess means comprising the steps of:
submerging a blank into the first receiving means;
moving the blank into the recess means to displace a dam barrier section into the second receiving means;
removing the dam barrier from the second receiving means; and
repeating said submerging, moving and removing steps to remove the dam barrier from the forming chamber.

17. The method as set forth in claim 15 wherein the at least one well includes a first and a second well displaced about the groove and in communication therewith and a plurality of blanks mounted in the groove and wherein individual ones of the dam barrier sections are moved from the first well into the groove to displace individual ones of the blanks from the groove into the second well.

18. The method as set forth in claim 15 wherein the at least one well includes a first and a second well disposed about the groove and in communication therewith and a plurality of dam barrier sections are mounted in the groove and wherein individual ones of the dam barrier sections are moved from the first well into the groove to displace individual ones of the dam barrier sections from the groove into the second well.

* * * * *